United States Patent
Dakroub

(10) Patent No.: US 9,042,207 B2
(45) Date of Patent: May 26, 2015

(54) MAGNETIC RECORDING LASER DIODE CONTROL

(71) Applicant: Seagate Technology LLC, Cupertino, CA (US)

(72) Inventor: Housan Dakroub, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/890,785

(22) Filed: May 9, 2013

(65) Prior Publication Data

US 2014/0334274 A1    Nov. 13, 2014

(51) Int. Cl.
| | | |
|---|---|---|
| *G11B 13/04* | (2006.01) | |
| *G11B 5/60* | (2006.01) | |
| *G11B 11/105* | (2006.01) | |
| *G11B 5/31* | (2006.01) | |
| *G11B 5/00* | (2006.01) | |

(52) U.S. Cl.
CPC .............. *G11B 5/6088* (2013.01); *G11B 13/04* (2013.01); *G11B 11/10539* (2013.01); *G11B 5/314* (2013.01); *G11B 2005/0021* (2013.01)

(58) Field of Classification Search
CPC ..................... G11B 5/4866; G11B 2005/0021; G11B 7/125; G11B 7/126; G11B 5/314; G11B 2005/001; G11B 13/00; G11B 13/04; G11B 11/105; G11B 11/10534; G11B 11/10539
USPC ................. 360/59, 114.02; 369/13.02, 13.17, 369/13.24, 13.32, 13.33
See application file for complete search history.

(56) References Cited

U.S. PATENT DOCUMENTS

| | | | |
|---|---|---|---|
| 4,835,780 A | 5/1989 | Sugimura et al. | |
| 5,222,072 A | 6/1993 | Oku | |
| 5,568,464 A | 10/1996 | Horie | |
| 5,912,694 A | 6/1999 | Miyake et al. | |
| 7,042,669 B2* | 5/2006 | Ogawa et al. | ................... 360/55 |
| 8,094,693 B2* | 1/2012 | Nakayama et al. | ...... 372/29.011 |
| 8,344,654 B2 | 1/2013 | Horiuchi et al. | |
| 8,379,681 B2 | 2/2013 | Kyogoku | |
| 2002/0003752 A1* | 1/2002 | Fuji et al. | ................... 369/13.13 |
| 2004/0032890 A1 | 2/2004 | Murata | |
| 2004/0190175 A1* | 9/2004 | Chey et al. | ...................... 360/59 |
| 2007/0053395 A1 | 3/2007 | Kamatani et al. | |
| 2008/0008062 A1 | 1/2008 | Rees et al. | |
| 2009/0303629 A1* | 12/2009 | Nakano et al. | ................... 360/31 |
| 2010/0061200 A1* | 3/2010 | Shimazawa et al. | ........ 369/13.33 |
| 2010/0238580 A1* | 9/2010 | Shimazawa et al. | ............ 360/59 |
| 2012/0051196 A1* | 3/2012 | Grobis et al. | .............. 369/13.24 |
| 2012/0134246 A1* | 5/2012 | Shimazawa | ................ 369/13.26 |
| 2012/0176874 A1* | 7/2012 | Komura et al. | ............ 369/13.26 |
| 2012/0275279 A1 | 11/2012 | Wilson et al. | |
| 2013/0058368 A1* | 3/2013 | Dean et al. | ................. 372/38.02 |

* cited by examiner

*Primary Examiner* — Thomas Alunkal
(74) *Attorney, Agent, or Firm* — Hollingsworth Davis, LLC

(57) ABSTRACT

Controlling a laser diode involves activating a first current source in preparation for writing to a magnetic recording medium. The first current source applies a threshold current to a laser diode that brings the laser diode close to an operating point. Responsive to a write signal, a second current source is activated that applies a write current to the laser diode. A combination of the write current and the threshold current fully energizes the laser diode and is less than a target recording current. Coincident with the activation of the second current source, a photodiode is activated that is optically coupled to the laser diode. The activated photodiode causes a feedback current to be applied to the laser diode.

20 Claims, 5 Drawing Sheets

MAGNETIC RECORDING LASER DIODE CONTROL

SUMMARY

The present disclosure is related to control of laser diodes in applications such as magnetic recording. In one embodiment, a method involves activating a first current source in preparation for writing to a magnetic recording medium. The first current source applies a threshold current to a laser diode that brings the laser diode close to an operating point. Responsive to a write signal, a second current source is activated that applies a write current to the laser diode. A combination of the write current and the threshold current fully energizes the laser diode and is less than a target recording current. Coincident with the activation of the second current source, a photodiode is activated that is optically coupled to the laser diode. The activated photodiode causes a feedback current to be applied to the laser diode.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

DETAILED DESCRIPTION

The present disclosure is generally related to monitoring and control of laser power for a heat assisted magnetic recording (HAMR) device. A HAMR device uses an energy source (e.g., a laser diode) to create hotspot on a magnetic medium as it is being recorded. A HAMR medium has high magnetic coercivity that prevents thermally-induced random changes in magnetic orientation that would otherwise limit areal density. The energy source applies heat that temporarily lowers magnetic coercivity of the hotspot, allowing its magnetic orientation to be more easily changed by a magnetic write transducer.

While a wide variety of electronic devices (e.g., printers, optical data storage devices) employ lasers, a HAMR laser has its specific requirements. For example, a HAMR laser may have requirements related to, size, output power/wavelength, etc., that are unique to this type of application. Circuitry used to control a HAMR laser may also have similar, unique, requirements.

One challenging aspect of HAMR laser control relates to power monitoring and feedback. Laser power monitoring for HAMR magnetic recording may require instantaneous (or as close to instantaneous as possible) feedback control. Implementing instantaneous laser feedback control for HAMR presents some unique challenges that may not be present in other laser diode applications.

A HAMR laser should be able to quickly transition from on and off states (e.g., for format efficiency). For example, the laser may need to be turned off when passing by servo marks that are regularly spaced on the surface of the medium. Otherwise, if the laser were to heat the servo marks, the marks could become degraded over time. At the same time, a high quality preamble is desired to be recorded after the end of the servo marks. There is no time to adjust laser power in such a case as would be case with communications and industrial applications that employ relatively slow control loops.

There are also limits as to how much current can flow in the laser diode before HAMR recording starts. This is to avoid possible data erasure, e.g., if media is inadvertently heated to the Curie point and coercivity is reduced. Instantaneous laser diode intensity variations (at least when laser is turned on) may be more detrimental in HAMR than in industrial or communications applications. This is due to the lack of real-time recording feedback, e.g., there may be no "read-after-write" checking.

Large signal rise time and bandwidth are desirable if HAMR requires real-time laser or near-real-time diode power monitoring. This is not always the case in communications applications where time penalties in reaching an operating point are not so severe. In some HAMR schemes, a laser diode overshoot or compensation current is injected at the start of recording. In this disclosure, a feedback loop will automatically compensate the laser diode at the start of recording.

Figure 1:
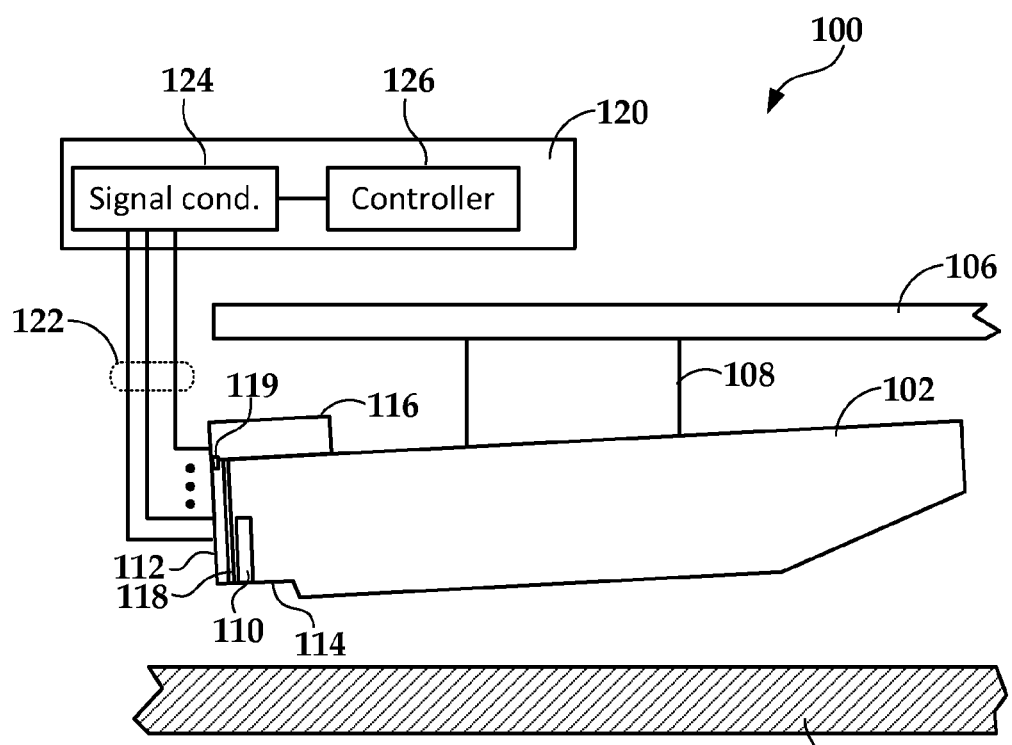
FIG. 1 is a block diagram of an apparatus according to an example embodiment.

In FIG. 1, a block diagram illustrates a data storage apparatus 100 according to an example embodiment. The apparatus includes a slider 102 that is configured to at least write to a HAMR recording medium 104. The slider 102 is coupled to an arm 106 by way of a gimbal suspension 108 that allows some relative motion between the slider 102 and arm 106. The slider 102 includes a transducer region 110 at a trailing edge 112 of the slider 102.

The transducer region 110 includes at least a write transducer (e.g., magnetic write pole and coil) and may also include a read transducer (e.g., magnetoresistive read stack). The transducer region 110 is located at a media facing surface 114 of the slider 102 which is held close to the recording medium 104 during write and/or read operations. The media facing surface 114 may include air-bearing features that form an air cushion between the slider 102 and the spinning recording medium 104, thereby maintaining a desired flying height.

A laser diode 116 is also coupled to the slider 102. The slider 102 includes an optical coupling path 118 that delivers energy from the laser diode 116 to the recording medium 104 via the media-facing surface 114. The energy from the laser diode 116 creates a hotspot on a surface of the recording medium 104, which facilitates high density recording of data via the write transducer. A photodiode 119 is also included in the laser diode 116 and/or slider 102.

The apparatus 100 includes control circuitry 120 that is coupled to the slider 102 and laser diode 116 via signal and power lines 122. The control circuitry 120 may include at least signal conditioning circuits 124 (e.g., buffers, filters, pre-amplifiers, etc.) used for analog conditioning of the signals. A digital controller 126 processes digital inputs and outputs for communication and control of the slider-mounted components, as well as other functional components that are not shown in this view, e.g., actuators, cache, host interface, etc.

The apparatus 100 provides for real-time, instantaneous control of the laser diode 116 via the photodiode 119. Real-time and instantaneous control may be nearly achieved because the photodiode 119 and laser diode 116 have sufficiently fast response times. The photodiode 119 may be integrated into the laser diode 116 or be integrated into the slider 102. Generally, the photodiode 119 is coupled as a feedback element, and two current sources (not shown) are used to quickly switch on the laser diode 116 with minimal response time and minimal overshoot. A general operating concept of this type of control circuitry according to an example embodiment is shown in the block diagram of FIG. 2.

Figure 2:
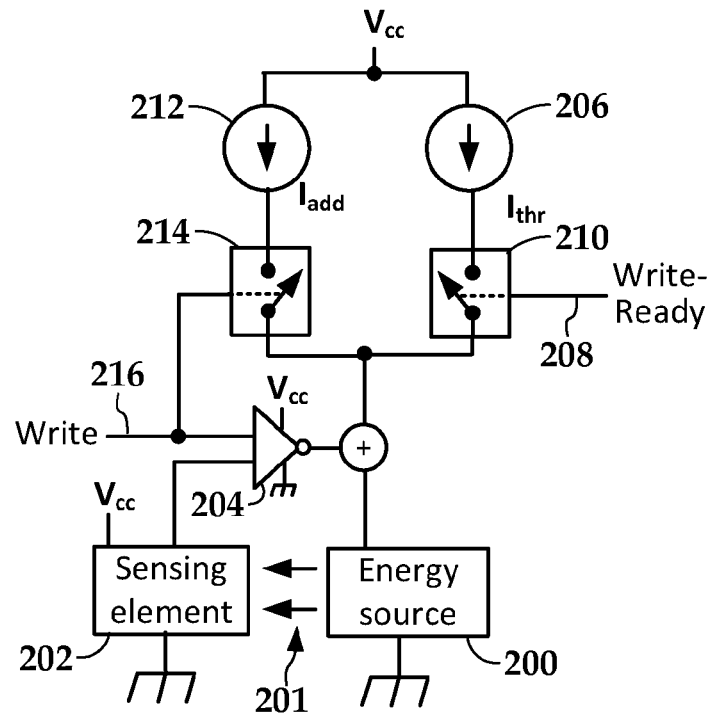
FIG. 2 is a block diagram of control circuitry according to an example embodiment.

In FIG. 2, an energy source 200 (e.g., a laser diode) has an energy output 201 usable to heat a recording medium. The output 201 from the energy source 200 is detectable by a sensing element 202 (e.g., a photodiode) that is, e.g. optically coupled to sense the energy output 201. The sensing element 202 provides a feedback signal to the amplifier 204, which applies a feedback current to energy source 200. As indicated in the figure, the amplifier's output is inverted, so that the sensing element 202 provides negative feedback.

A first current source 206 is coupled to apply a threshold current $I_{thr}$ to the energy source 200 via a first switching element 210. A write-ready line 208 activates the first switching element 210. The threshold current $I_{thr}$ provided by the first current source 206 is just below an activation current of the energy source 200. As a result, asserting the write-ready signal line 208 by itself does not energize the energy source 200. The write-ready signal line 208 brings the energy source 200 closer to an operating point, and is asserted in preparation for activating the energy source 200, e.g., when in a writing mode but before reaching a target sector, while passing over servo marks in writing mode, etc.

A second current source 212 is coupled to apply a write current $I_{add}$ to the energy source 200. The write current $I_{add}$, in combination with the threshold current $I_{thr}$, provides sufficient current to energize the energy source 200, although at less than a target recording current level desired for the energy source 200. A write signal line 216 activates the both the second current source 212 via second switching element 218 and the sensing element 202 via amplifier 204. The write signal line 216 is asserted during recording while the write-ready line 208 is asserted, and connects the second current source 212 coincident with the sensing element 202 to the energy source 200.

Figure 3:
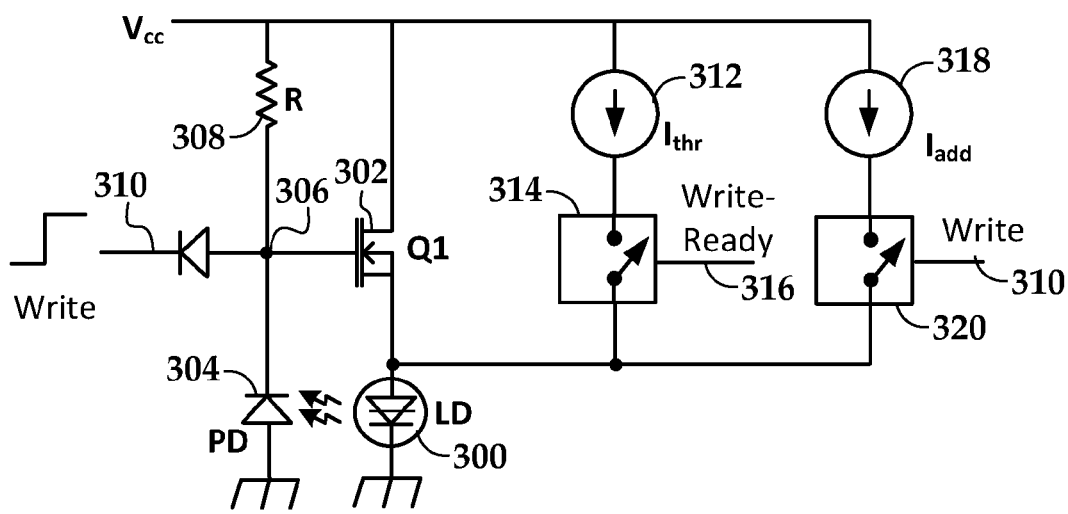
FIG. 3 is a schematic diagram of a laser diode control circuit according to an example embodiment.

In reference now to FIG. 3, a schematic diagram shows a laser diode control circuit according to an example embodiment. The circuit includes a laser diode 300 coupled in series with a metal-oxide semiconductor field-effect transistor (MOSFET) 302. The MOSFET 302 is configured as an amplifier, with the source of the MOSFET 302 coupled to an anode of the laser diode 300. The drain of the MOSFET 302 is coupled to the input voltage Vcc and the gate is connected to the cathode of photodiode 304. It will be understood that, under some conditions, amplifier means other than a MOSFET may be used, such as a junction FET (JFET), insulated-gate bipolar transistor (IGBT), bipolar junction transistor (BJT), and equivalents thereof.

The photodiode 304 is optically coupled to the laser diode 300. The cathode of the photodiode 304 is joined to a biasing resistor 308 and input (gate) of the MOSFET 302 at coupling point 306. When a write signal line 310 is activated (asserted high in this example), the photodiode 304 is coupled to apply a feedback signal to the MOSFET 302, which applies a feedback current to the laser diode 300. The resistor 308 is also part of the feedback loop. The value of the resistor 308, along with the photodiode current, will determine the feedback current into the laser diode. A programmable current source may be used instead of or along with the resistor 308.

A first current source 312 is coupled to apply a threshold current $I_{thr}$ to the laser diode 300 that does not fully energize the laser diode (e.g., does not cause the laser diode to illuminate substantially so that it would negatively affect coercivity of the recording medium). The first current source 312 applies the threshold current $I_{thr}$ via a first switching element 314, which couples the first current source 312 to the laser diode 300 when a write-ready signal 316 is asserted. The threshold current $I_{thr}$ is close to an operating point of the laser diode 300, such that application of a small amount of additional current will activate the laser diode 300. For example, if the laser diode 300 significantly illuminates at $I_1$ such that heating of the media occurs, and $I_{max}$ is a maximum rated current of the laser diode, then the threshold current may be defined as $I_{thr}=I_1-I_2$, where $I_2=PI_{max}$, and P=5% or less, e.g., 5%, 4%, 3%, 2%, 1%, or any fractional value in between.

A second current source 318 is coupled to apply a write current $I_{add}$ to laser diode 300 via second switching element 320. The second switching element 320 is activated by the write signal line 310 (which is the same line that is coupled to coupling point 306). The combination of write current $I_{add}$ and threshold current $I_{thr}$ is sufficient to fully energize the laser diode (e.g., illuminates the laser diode), although the combination of $I_{add}$ and $I_{thr}$ is less than a target recording current, e.g., a current that supplies optimal/desired energy for recording to a HAMR media.

Because the write line 310 activates both second switching element 320 and the feedback current provided via the MOSFET 302, the laser diode 300 quickly (e.g., 5 ns or less after activation of the write signal) reaches the target recording current with minimal overshoot. In this example, the feedback current is additive to the currents $I_{add}$ and $I_{thr}$ provided by current sources 318. In other configurations (not shown), the feedback current could be subtractive, in which case $I_{add}+I_{thr}$ would be greater than the target current, but would be quickly reduced by the activation of the feedback current.

During device operation, the write-ready signal line 316 is coupled to activate the first current source 312 in preparation for activating the laser diode 300. The write-ready signal line 316 and associated first switching element 314 may be optional. The system will switch on the laser diode 300 in response to a write signal as described above if $I_{thr}$ is always applied via first current source 312, although such a configuration may have consequences regarding power consumption and life of the laser diode 300. The write signal line 310 is shown connected to both the coupling point 306 and second switching element 320, the latter activating the second current source 318. As a result, the write signal activates the feedback current provided by the MOSFET 302 and photodiode 304 coincident with the second current source 318 to energize the laser diode 300.

It will be understood that the illustrated diagram is only one example configuration, and a number of variations are possible. For example the polarities of some or all applied voltages, diodes, current source, and amplifiers may be reversed from what is shown here. Similarly, write signals and/or write-ready signals may be implemented as be activated when set low or high. Some components, such as first switching element 314, may be optional. Other components may provide multiple functions. For example, the MOSFET 302 may be configured to provide threshold current $I_{thr}$, the value of which is adjusted via the photodiode 304. The switching elements 314, 320 may be implemented using any switching device means, such as MOSFET, JFET, IGBT, BJT, etc., and equivalents thereof. The current sources 312, 318 (as well as biasing resistor 308) may be implemented using precision circuits known in the art that utilize, among other things, operational amplifiers, digital-to-analog computers, FETS, etc.

In the configuration shown in FIG. 3, the current flowing through the laser diode when the write signal 310 is activated includes a sum of only the threshold current $I_{thr}$, the write current $I_{add}$, and the feedback current. As such, the control circuit is simple and does not require a large amount of negative feedback. This provides for fast laser diode activation with minimal overshoot and settling time. The entire read-to-write time period of the HAMR device should be on the order of 10-20 nanoseconds to minimize the impact on format efficiency. The response time of the illustrated laser control loop is on the order of a few nanoseconds, and this facilitates reaching the target read-to-write time period response. Because the accuracy of laser output may not ultimately be an issue in this application, low levels of negative feedback can be used. This helps with loop stability and rise time constraints.

The threshold current $I_{thr}$ and the write current $I_{add}$ may be predetermined at during operation, e.g., set at the factory during operation, and subject to occasional adjustments as components wear. Generally, the threshold current $I_{thr}$ and the write current $I_{add}$ may be constant within a given time frame, e.g., while at least the write signal line 310 and/or write-ready signal line 316 are asserted. Generally, this means that the current source 312, 318 are not subjected to in-use adjustment of current levels, e.g., not adjusted based on feedback signals.

Figure 4:
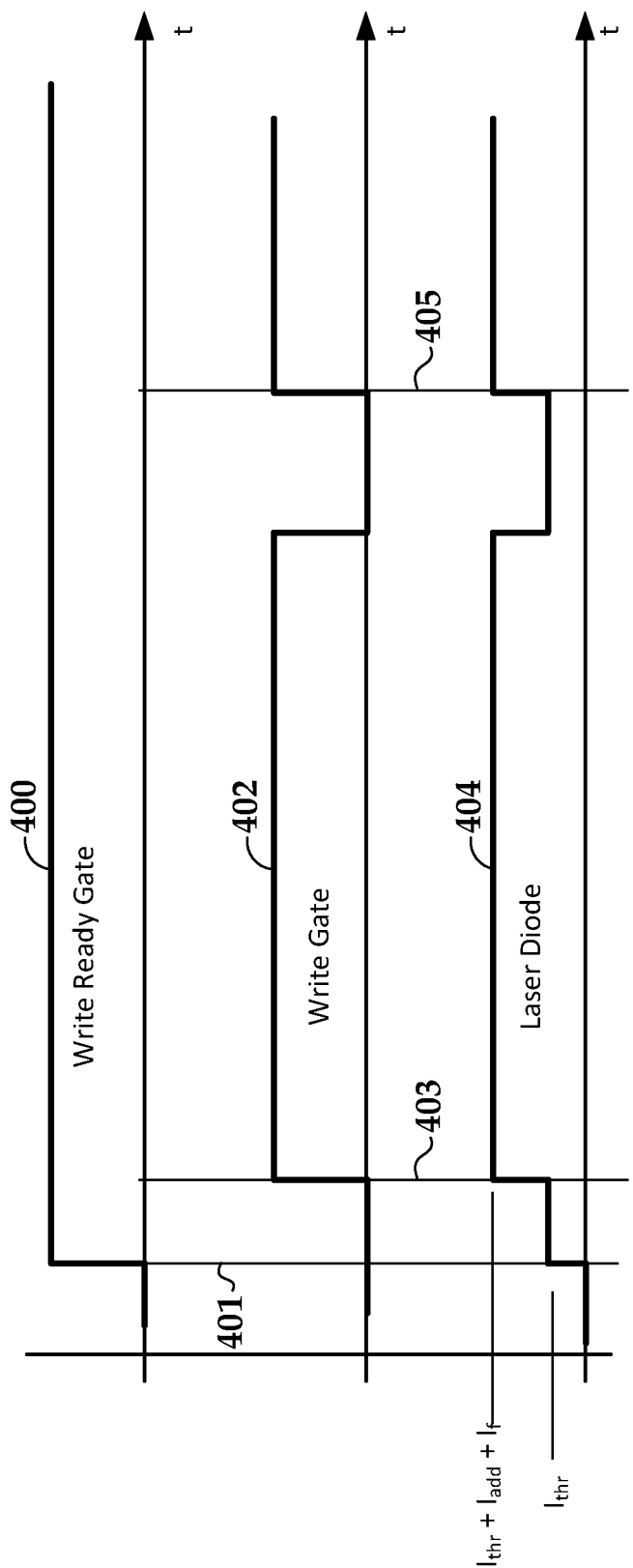
FIG. 4 is a timing diagram showing control signals according to an example embodiment.

In reference now to FIG. 4, a timing diagram illustrates operation of a device according to an example embodiment. Trace 400 represents the write-ready signal, which is asserted at time 401 and remains on afterwards. Trace 402 represents the write signal, which is shown repeatedly asserted, beginning at times 403 and 405. Trace 404 represents current applied to the laser diode. Between time 401 and 403, the laser diode current is at $I_{thr}$, and after time 403, the laser diode current is $I_{thr}+I_{add}+I_f$, where $I_f$ is feedback current provided by the amplifier in response to inputs from the photodiode and biasing resistor or programmable current source.

Figure 5:
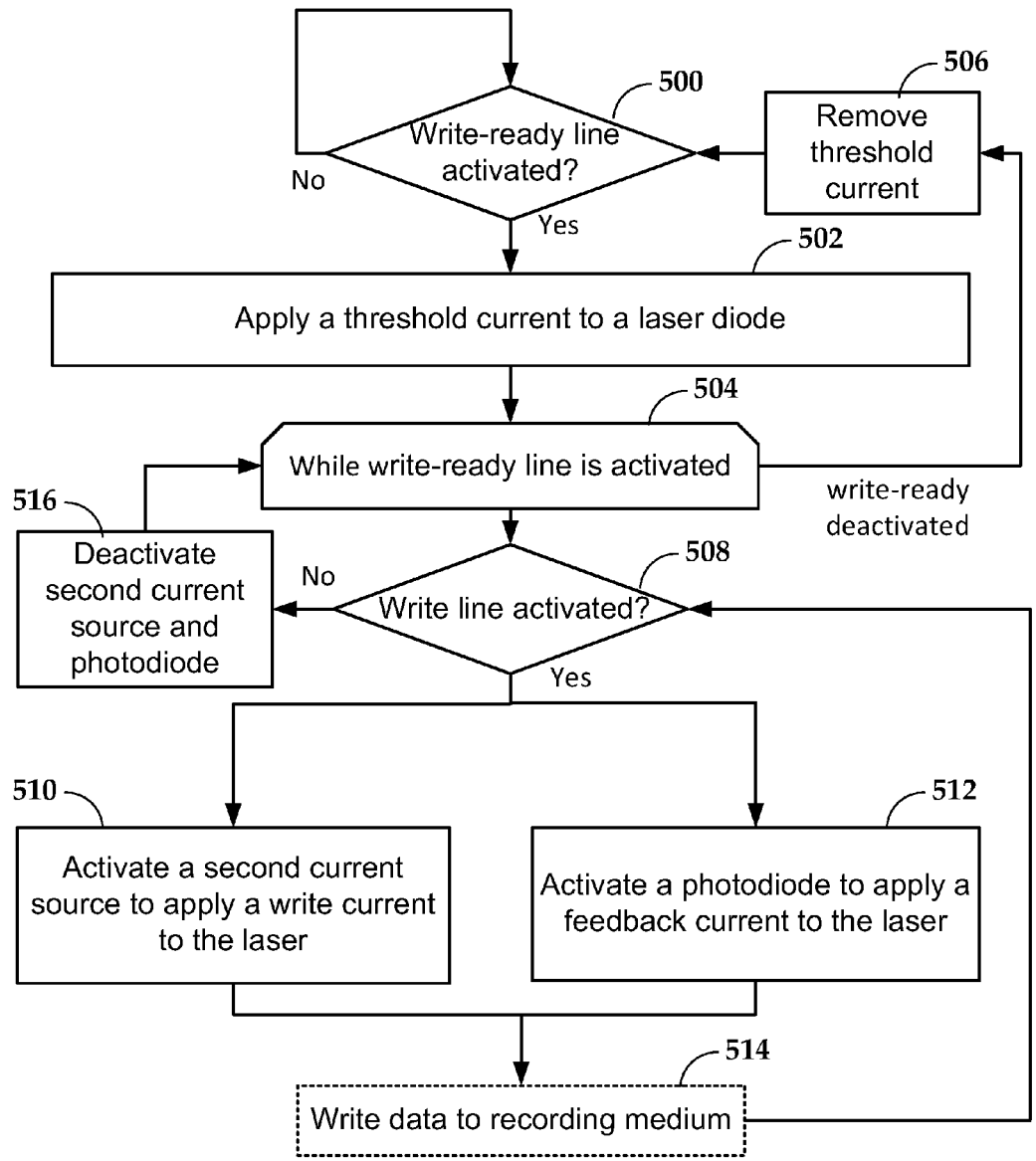
FIG. 5 is a flowchart illustrating a method according to an example embodiment.

In reference now to FIG. 5, a flowchart illustrates a method according to an example embodiment. A decision block 500 represents a wait state that determines if a write-ready signal line is activated. If so, a threshold current is applied 502 to a laser diode. The threshold current does not fully energize (e.g., does not substantially illuminate) the laser diode, but does place the laser diode close to an energized state. Loop limit 504 represents a write-ready state loop that remains active until the write-ready signal line is deactivated. The threshold current is applied 502 while in the write-ready state loop, and is removed 506 when the loop exits, e.g., write-ready line deactivated.

Decision block 508 determines whether a write line is activated while in the write-ready state. If so, a write state is entered where a second current source coupled to the laser diode is activated 510, and a photodiode is activated 512 coincident with the activation 510 of the laser diode. The photodiode is optically coupled to the laser and causes a feedback current to be applied thereto (e.g., via an amplifier). If it is determined at block 508 that the write line is no longer activated, the second current source and photodiode are deactivated 516.

During the write state, data may be written 514 to a recording medium. Writing 514 may involve, among other things, applying an encoded signal to a write coil proximate a heat assisted magnetic recording medium. The encoded signal applies a magnetic field to write data to the recording medium while the laser diode is energized It should be noted that there may be situations where the laser may be energized but the write coil is not, and so the operation of the laser control circuits may be independent of magnetic write activity.

Figure 6:
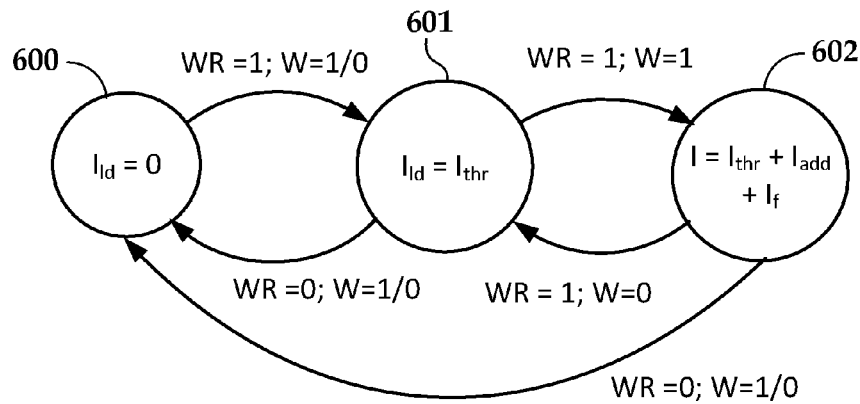
FIG. 6 is a state diagram illustrating operational states of a device according to an example embodiment.

In FIG. 6, a state diagram illustrates states of a device according to an example embodiment. Three states 600-602 are shown. At an idle state 600, the laser diode current $I_{ld}$ is zero (or close to zero, e.g., may be affected by leakage or stray currents). At state 601, the laser diode current $I_{ld}$ is equal to the threshold current $I_{thr}$. At state 602, the laser diode current $I_{ld}$ is equal to the threshold current $I_{thr}$ plus write current $I_{add}$ plus feedback current $I_f$. The state transitions are shown for a simultaneous condition of write-ready (WR) and write (W) signals, where a '1' indicates activated and a '0' indicates deactivated.

It should be noted that in this example, the system will return to state 600 for WR=0, regardless of the state of W. This behavior may be enforced in logic or by the addition of additional switching elements to the diagrams of FIGS. 2 and 3. As shown, the examples in FIGS. 2 and 3 may exhibit yet another state if W=1 and WR=0, namely one where the laser diode current $I_{ld}$ is equal to the write current $I_{aa}$ plus feedback current $I_f$. This behavior may be useful under some conditions, and so may be provided as an additional state in some embodiments.

It should be noted that the embodiments shown herein may be configured for alternate activation scenarios. For example, swapping the write-ready and write signals in FIGS. 2 and 3 may also facilitate a similar mode of operation where the laser is energized when both signals are activated, although some performance characteristics may change in such an arrangement. Similarly, the photodiode 304 and first current source 312 may be activated by the write-ready signal, and the second current source 318 alone activated by the write signal. The components of FIG. 2 may be arranged similarly.

Figure 7:
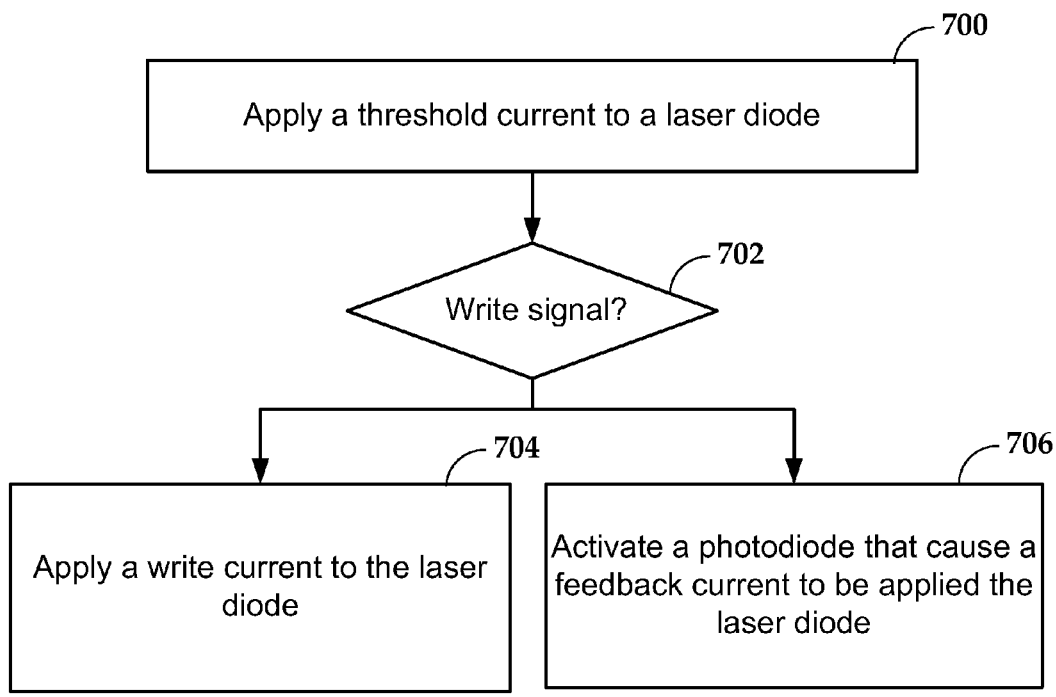
FIG. 7 is a flowchart illustrating a method according to an example embodiment.

In reference now to FIG. 7, a flowchart illustrates a method according to an example embodiment. A threshold current is applied 700 to a laser diode. The threshold current does not fully energize (e.g., does not substantially illuminate) the laser diode. If a write signal is detected 702, a second current source is activated 704, and coincidentally, a laser diode is activated 704. The second current source applies a write current to the laser diode that, in combination with the threshold current, fully energizes (e.g., illuminates) the laser diode. The photodiode is optically coupled to the laser diode and causes a feedback current to be applied thereto.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
   activating a first current source in preparation for writing to a magnetic recording medium, the first current source applying a threshold current to a laser diode that brings the laser diode close to an operating point;
   responsive to a write signal, activating a second current source that applies a write current to the laser diode that, in combination with the threshold current, illuminates the laser diode and is less than a target recording current; and
   coincident with the activation of the second current source, activating a photodiode that is optically coupled to the laser diode, the activated photodiode causing a feedback current to be applied to the laser diode.

2. The method of claim 1, wherein the write signal is delivered by a write signal line that is coupled to:
   an input of an amplifier that applies the feedback current;
   the photodiode; and
   a biasing resistor or programmable current source in series with the photodiode.

3. The method of claim 2, wherein the amplifier comprises a metal-oxide-semiconductor field-effect transistor (MOSFET).

4. The method of claim 1, wherein the target recording current is applied to the laser diode responsive to both the activation of the second current source and the activation of the photodiode.

5. The method of claim 4, wherein the laser diode reaches a target energizing level in 5 nanoseconds or less after application of the write signal.

6. The method of claim 1, further comprising applying a magnetic field to write data to the magnetic recording medium while the laser diode is energized.

7. An apparatus comprising:
   a first current source that, in preparation for writing to a magnetic medium, applies a threshold current to a laser diode that brings the laser diode close to an operating point;
   a second current source that, responsive to a write signal, applies a write current to the laser diode in combination with the threshold current so that less than a target recording current is applied to the laser diode; and
   an amplifier that receives, from a photodiode optically coupled to the laser diode, a feedback signal that is proportional to an energy output of the laser diode, and responsive to the write signal, applies a feedback current to the laser diode coincident with the applying of the write current.

8. The apparatus of claim 7, wherein the amplifier comprises a metal-oxide-semiconductor field-effect transistor (MOSFET), and wherein a gate of the MOSFET receives the feedback signal of the photodiode responsive to the write signal being applied to the gate.

9. The apparatus of claim 8, further comprising resistor or a programmable current source coupled to the gate in series with the photodiode.

10. The apparatus of claim 7, wherein a current flowing through the laser diode responsive to the write signal comprises of a sum of only the threshold current, the write current, and the feedback current.

11. The apparatus of claim 7, further comprising a write-ready line that activates the first current source in response to a write-ready signal and prior to the write signal.

12. The apparatus of claim 7, wherein the laser diode reaches a target energizing level in 5 nanoseconds or less after the write signal is applied.

13. The apparatus of claim 7, wherein the threshold current and the write current are predetermined.

14. The apparatus of claim 7, wherein the threshold current and the write current are constant.

15. The apparatus of claim 7, wherein the threshold current does not significantly illuminate the laser diode.

16. A system comprising
    a slider comprising a laser diode and a photodiode optically coupled to the laser diode; and
    a control circuit comprising:
        a first current source that applies a threshold current to the laser diode that brings the laser diode close to an operating point;
        a second current source that applies a write current in combination with the threshold current to the laser diode, the combination of the write current and the threshold current illuminating the laser diode and are less than a target recording current;
        an amplifier having an input coupled to the photodiode and an output applying a feedback current to the laser diode;
        a write-ready signal line coupled to activate the first current source in preparation for activating the laser diode; and
        a write signal line coupled to activate the feedback current coincident with activating the second current source to energize the laser diode.

17. The system of claim 16, wherein the amplifier comprises a metal-oxide-semiconductor field-effect transistor (MOSFET), and wherein a gate of the MOSFET is connected to the write signal line, the photodiode, and a resistor or programmable current source in series with the photodiode.

18. The system of claim 16, wherein the laser diode reaches a target energizing level responsive to the activating of both the photodiode and the second current source in 5 nanoseconds or less after activation of the write signal line.

19. The system of claim 16, wherein a current flowing through the laser diode when the write signal is activated comprises of a sum of only the threshold current, the write current, and the feedback current.

20. The system of claim 16, wherein the slider further comprises a magnetic write transducer that facilitates writing to a magnetic medium during activation of the write signal line.

* * * * *